United States Patent Office 2,764,607
Patented Sept. 25, 1956

2,764,607
RECOVERY OF PHOSGENE IN THE PRODUCTION OF CHLOROFORMATES

Clarence E. Hieserman and Walter R. Edwards, Cumberland, Md., assignors to Celanese Corporation of America, New York, N. Y., a corporation of Delaware No Drawing. Application July 26, 1952, Serial No. 301,168

3 Claims. (Cl. 260—463)

This invention relates to a process for the recovery of phosgene, and relates more particularly to an improved process for the recovery of the phosgene from mixtures thereof with hydrogen chloride.

In the production of chloroformates excess phosgene is reacted with a hydroxy compound such as an alcohol. Normally, a brine-cooled reflux condenser is employed for the purpose of retaining the phosgene in the reaction vessel. However it is found that the hydrogen chloride which is given off during the reaction and passes out of the reaction vessel through the reflux condenser carries with it a considerable portion of the phosgene. In some cases the amount of the phosgene escaping in this manner is about four times as much as the amount, calculated on the basis of the partial pressure of the phosgene at the condenser temperature, which would theoretically be expected to escape. One expedient which has been employed to overcome this excessive loss of phosgene is the placing of baffles in the condenser and the packing of said condenser with Berl saddles. This, however, has not succeeded in material decreasing the loss.

It is an object of this invention to provide a phosgene recovery process for overcoming the foregoing and other disadvantages of the processes previously used for this purpose.

It is a further object of this invention to provide a process for recovery of phosgene from mixtures thereof with hydrogen chloride.

Still another object of this invention is the provision of an improved and more efficient process for the production of chloroformates.

Other objects of this invention will appear from the following detailed description and the accompanying claims.

According to the present invention the mixture containing phosgene and hydrogen chloride, which passes through the condenser, is extracted with a solvent for the phosgene. More particularly, a cold mixture of hydrogen chloride and phosgene is passed into contact with a cold solvent which preferentially absorbs the phosgene. For optimum results, the extraction step should be carried out at a temperature below 0° C., preferably in the range of —10 to —40° C. We have found chlorobenzene to be an excellent solvent for this purpose. Other suitable solvents which do not react with the phosgene or hydrogen chloride are other chlorinated hydrocarbons such as dichloroethane, chloroform or carbon tetrachloride, aromatic hydrocarbons such as xylene or benzene, aliphatic hydrocarbons of lower molecular weight such as gasoline, fatty acids such as acetic acid and esters such as ethyl acetate.

Following the extraction step the phosgene is removed from the solvent. This removal may be carried out in any suitable manner. We have obtained best results, however, by continuously distilling off the phosgene and any absorbed hydrogen chloride in a distillation column and then condensing out the phosgene.

While the process of this invention may be employed for the recovery of phosgene in connection with a great variety of phosgenation reactions, it is particularly applicable to the recovery of phosgene in the production of chloroformates by reaction of excess phosgene with hydroxy compounds such as alcohols or phenols, e. g. monohydric alcohols, such as ethyl or butyl alcohol, or polyhydric alcohols, such as ethylene glycol, diethylene glycol, trimethylene glycol, tetramethylene glycol, glycerol or mannitol, or phenols, such as phenol or resorcinol. In such reactions it improves the efficiency and economy of the process by recovering the phosgene for recirculation to the reaction mixture and by effecting savings in the amount of caustic necessary to neutralize such phosgene as escapes in the stream of hydrogen chloride.

In order to further illustrate our invention, but without being limited thereto, the following examples are given:

Example I 3 moles of phosgene and 1 mole of butanediol 1,4 are reacted in a conventional manner to produce butanediol-bis-chloroformate in a vessel fitted with a brine-cooled condenser operating at —18° C. A stream of hydrogen chloride gas and uncondensed phosgene, containing 39.2% by weight of phosgene, passes out from the top of the condenser at the rate of about 212 parts by weight per hour. This stream is led into the bottom of a packed brine-cooled absorption column operated at a temperature of —18° C. Monochlorobenzene from a storage reservoir is passed by gravity through a brine-cooled precooler, where it is cooled to a temperature of —18° C., and then into the top of the absorption column at the rate of 950 parts by weight per hour. Most of the hydrogen chloride, which is only slightly soluble in the chlorobenzene at the temperature of extraction, passes out from a vent at the top of the absorption column and into a caustic scrubber. The phosgene-laden chlorobenzene passes out from the bottom of the absorption column and is treated for separation into its components by feeding it to the central portion of a distillation column fitted with a reboiler, the reboiler being maintained at a temperature of about 132° C. The gases coming out of the top of the distillation column are passed through a water-cooled reflux condenser to eliminate any chlorobenzene, then to a brine-cooled condenser operating at a temperature of —18° C., and finally to a brine-cooled storage reservoir equipped with a vent for discharging the remaining hydrogen chloride. 67 parts by weight of phosgene per hour are collected in the reservoir.

Example II 3 moles of phosgene and 1 mole of butanediol 1,4 are reacted in a conventional manner to produce butanediol-bis-chloroformate in a vessel fitted with a brine-cooled condenser operating at —18° C. A stream of hydrogen chloride gas and uncondensed phosgene, containing 43.4% phosgene, escapes from the top of the condenser at the rate of about 230 parts by weight per hour. This stream is led into the bottom of a packed brine-cooled absorption column operated at a temperature of —18° C. Monochlorobenzene, cooled to a temperature of —18° C., is led into the top of the absorption column at the rate of 1828 parts by weight per hour. Hydrogen chloride gas passes out from the top of the absorption column. Phosgene-laden chlorobenzene, which passes out from the bottom of the absorption column, is separated in a distillation column as described in Example I. 94 parts by weight of phosgene per hour are collected in the brine-cooled storage vessel.

It is to be understood that the foregoing detailed description is given merely by way of illustration and that many variations may be made therein without departing from the spirit of our invention.

Having described our invention, what we desire to secure by Letters Patent is:

1. In the process of making a chloroformate by the reaction of excess phosgene with a hydroxy compound, in which a mixture of phosgene and hydrogen chloride is given off from said reaction, the improvement which comprises passing said mixture through a cooled zone to remove a portion of its phosgene content by condensation and passing the remaining uncondensed mixture into contact with a liquid preferential solvent for the phosgene, said solvent being selected from the class consisting of chlorobenzene, dichloroethane, chloroform, carbon tetrachloride, xylene, benzene, gasoline, acetic acid and ethyl acetate, at a temperature below 0° C. to extract the phosgene from said mixture.

2. In the process of making a chloroformate by the reaction of excess phosgene with a hydroxy compound, in which a mixture of phosgene and hydrogen chloride is given off from said reaction, the improvement which comprises passing said mixture through a cooled zone to remove a portion of its phosgene content by condensation and passing the remaining uncondensed mixture into contact with a liquid preferential solvent for the phosgene, said solvent being selected from the class consisting of chlorobenzene, dichloroethane, chloroform, carbon tetrachloride, xylene, benzene, gasoline, acetic acid and ethyl acetate, at a temperature of −10° to −40° C. to extract the phosgene from said mixture.

3. In the process of making a chloroformate by the reaction of excess phosgene with a hydroxy compound, in which a mixture of phosgene and hydrogen chloride is given off from said reaction, the improvement which comprises passing said mixture through a cooled zone to remove a portion of its phosgene content by condensation and passing the remaining uncondensed mixture into contact with monochlorobenzene at a temperature of −10° to −40° C. to extract the phosgene from said mixture and distilling off the phosgene from said extract.

References Cited in the file of this patent

UNITED STATES PATENTS

| | | |
|---|---|---|
| 1,603,689 | Hammond | Oct. 19, 1926 |
| 2,258,400 | Wuertz et al. | Oct. 7, 1941 |
| 2,265,194 | Reibnitz | Dec. 9, 1941 |
| 2,326,501 | Siefken et al. | Aug. 10, 1943 |
| 2,370,572 | Muskat | Feb. 27, 1945 |
| 2,496,091 | Hammond | Jan. 31, 1950 |
| 2,640,068 | Schaefer et al. | May 26, 1953 |
| 2,643,264 | Fauser | June 23, 1953 |